United States Patent
Horibe

(10) Patent No.: US 7,176,830 B2
(45) Date of Patent: Feb. 13, 2007

(54) IMAGE PROCESSING SYSTEM FOR MOUNTING TO A VEHICLE

(75) Inventor: Koji Horibe, Kasugai (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 11/280,745

(22) Filed: Nov. 15, 2005

(65) Prior Publication Data

US 2006/0125679 A1    Jun. 15, 2006

(30) Foreign Application Priority Data

Nov. 26, 2004   (JP) ............................ 2004-342950

(51) Int. Cl.
*G01S 13/08* (2006.01)
*G01S 13/93* (2006.01)
*G01S 17/08* (2006.01)
*G01S 17/93* (2006.01)
*G01S 13/00* (2006.01)
*G01S 17/00* (2006.01)

(52) U.S. Cl. ........................... 342/70; 342/52; 342/53; 342/54; 342/55; 342/118; 342/128; 342/133; 342/146; 342/147; 342/175; 342/176; 342/179; 342/195; 356/4.01; 701/300; 701/301

(58) Field of Classification Search ................. 701/300, 701/301; 180/167–169; 342/52–56, 70–72, 342/175, 176, 179, 195, 118, 128–133, 146, 342/147, 157, 158, 165–174, 27, 28; 356/4.01–5.15, 356/27, 28, 28.5

See application file for complete search history.

(56) References Cited

U.S. PATENT DOCUMENTS

| 4,063,073 | A | * | 12/1977 | Strayer ...................... 701/301 |
| 4,110,754 | A | * | 8/1978 | Endo .......................... 342/147 |
| 5,159,557 | A | * | 10/1992 | Ogawa ........................ 701/300 |
| 5,347,459 | A | * | 9/1994 | Greenspan et al. ......... 701/301 |
| 5,633,705 | A |   | 5/1997 | Asayama |
| 5,734,344 | A | * | 3/1998 | Yamada ....................... 342/72 |
| 5,793,325 | A | * | 8/1998 | Yamada ....................... 342/70 |
| 5,806,019 | A | * | 9/1998 | Ishiyama .................... 701/300 |
| 5,835,880 | A | * | 11/1998 | Gan et al. .................... 701/301 |
| 5,959,569 | A | * | 9/1999 | Khodabhai ................... 342/70 |
| 6,025,797 | A | * | 2/2000 | Kawai et al. ................. 342/70 |

(Continued)

FOREIGN PATENT DOCUMENTS

EP    0981059 A2    2/2000

(Continued)

*Primary Examiner*—Bernarr E. Gregory
(74) *Attorney, Agent, or Firm*—Beyer Weaver & Thomas LLP

(57) ABSTRACT

An image processing system to be mounted to a vehicle includes a radar adapted to measure distance and direction to an object based on reflected electromagnetic waves which are outputted to scan the exterior of the vehicle, an image-taking device such as a camera for obtaining an image, and an image processor for carrying out image processing on a specified image processing area in an image obtained by the image-taking device. The image processor is adapted to determine a center position of the image processing area according to a measurement point of an object detected by the radar and the size of the image processing area according to a beam profile of electromagnetic waves outputted from the radar.

18 Claims, 14 Drawing Sheets

U.S. PATENT DOCUMENTS

| | | | |
|---|---|---|---|
| 6,121,916 A * | 9/2000 | McDade | 342/70 |
| 6,246,949 B1 * | 6/2001 | Shirai et al. | 701/301 |
| RE37,725 E * | 6/2002 | Yamada | 342/72 |
| 6,522,286 B1 * | 2/2003 | Ashihara | 342/70 |
| 6,674,394 B1 * | 1/2004 | Zoratti | 342/70 |
| 6,771,208 B2 * | 8/2004 | Lutter et al. | 342/52 |
| 6,812,883 B2 * | 11/2004 | Kumon et al. | 342/70 |
| 6,831,591 B2 * | 12/2004 | Horibe | 342/52 |
| 6,834,232 B1 * | 12/2004 | Malhotra | 701/301 |
| 6,900,754 B2 * | 5/2005 | Ono et al. | 342/158 |

FOREIGN PATENT DOCUMENTS

| | | |
|---|---|---|
| EP | 1319961 A1 | 6/2003 |
| EP | 1580075 A2 | 9/2005 |
| JP | 06-124340 | 5/1994 |
| JP | 07-125567 | 5/1995 |
| JP | 2003-084064 | 3/2003 |
| WO | 2005/024464 | 3/2005 |

* cited by examiner

| -1 | 0 | 1 |
|---|---|---|
| -2 | 0 | 2 |
| -1 | 0 | 1 |

IMAGE PROCESSING SYSTEM FOR MOUNTING TO A VEHICLE

Priority is claimed on Japanese Patent Application 2004-342950 filed Nov. 26, 2004.

BACKGROUND OF THE INVENTION

This invention relates to an image processing system to be mounted to a vehicle, having a radar device and an image-taking device serving as a means for monitoring external conditions of the vehicle.

In order to realize the automatic cruising function of a vehicle by following a front-going vehicle, it is necessary to identify objects such as front-going vehicles and obstacles and to obtain their positional data, and a radar device such as a laser radar and a millimeter-wave radar and an image-taking device such as a CCD camera and a CMOS camera are used as a monitoring means for external conditions of the vehicle. Radar devices are capable of measuring the distance to an object and its direction relatively quickly and accurately but are disadvantageous in that they cannot accurately determine the type of the detected object such as whether it is a front-going vehicle or an object of a different kind. Image-taking devices are capable of carrying out a conventional type of image processing to thereby estimate what is the object found in an image but are disadvantageous in that the image processing is time-consuming and that a real-time response cannot be easily obtained.

In view of the above, Japanese Patent Publications Tokkai 7-125567 and 6-124340 have proposed image processing apparatus using both a radar device and an image-taking device for determining a specified area where an object may be estimated to be present in an image obtained by the image-taking device (hereinafter referred to as an image processing area) based on the result of measurement by the radar device and carrying out the image processing only within this specified area.

These conventional image processing apparatus have the following problems. The apparatus according to Japanese Patent Publications Tokkai 7-125567 is adapted to calculate a standard point and an area where the image processing is to be carried out by using a certain step formula but it can hardly be said that an image processing area is calculated according to the size or shape of a detected object. An area for setting an image is calculated according to a preliminarily estimated ratio between the length and the width. Thus, in the case of an object having an unexpected shape or size, it is not possible to set an appropriate image processing area. For example, if automobiles are being considered, image processing areas become too large for a person, a bicycle or a motorcycle.

Although Japanese Patent Publication Tokkai 7-125567 discloses a step of setting the size of an image processing area according to the distance to the object, nearly the entire image surface becomes the image processing area in the case, for example, of a bicycle that is immediately in front of one's own vehicle, and such a situation is not reasonable. If two objects with different sizes (such as a large truck and a bicycle) are present at the same distance, as another example, image processing areas with the same size may be set such that one area that is too large and another area that is too small may be set.

The apparatus according to Japanese Patent Publication Tokkai 7-125567, furthermore, is provided with a laser radar for scanning only in the horizontal direction. Thus, a beam that is elongated in the vertical direction must be used in order not to fail to detect objects in front because of a sloped condition of the road surface. If such a laser radar is used, the resolution in the horizontal direction may be set high but the resolution in the vertical direction necessarily becomes low. If there is a reflection from the object, it is practically impossible to determine the vertical position of the object within the detection range of the laser radar. For this reason, the vertical dimension of the image processing area must be set somewhat larger in order to prevent failure of detection and the image processing area may tend to become inappropriate.

The apparatus according to Japanese Patent Publication Tokkai 6-124340, on the other hand, makes use of a laser radar of the two-dimensional scan type, and an area in the horizontal and vertical directions is judged to be an area with the presence of an object if there are measurement points with the same distance data. The size of this area is multiplied by a certain factor to obtain an area larger than the object (including both the object itself and a portion surrounding the object) and this larger area is set as the image processing area.

For this reason, a two-dimensional radar scanning is carried out and the frequency of light emission by the laser radar (or the radar resolution) must be increased to a significant degree both in the vertical and horizontal directions in order to determine the horizontal and vertical positions of the area where an object is to be found. Thus, the radar operation and the processing of the measured data are both time-consuming, and the real-time processing becomes difficult. There is the further problem of an increased power consumption.

SUMMARY OF THE INVENTION

It is therefore an object of this invention to provide an image processing system which is to be mounted to a vehicle, having a radar and an image-taking device as monitoring means for external conditions, capable of appropriately setting an image processing area in an image obtaining by the image-taking device based on the results of measurement by the radar without requiring a radar device with a high resolution.

An image processing system according to this invention for mounting to a vehicle is characterized not only as comprising a radar adapted to measure distance and direction to an object outside the vehicle based on reflected electromagnetic waves which are outputted therefrom by scanning outside the vehicle, an image-taking device which obtains an outside image of the vehicle and an image processor for carrying out image processing on a specified image processing area in an image obtained by the image-taking device but also in that the image processor has the function of determining a center position of the image processing area according to a measurement point of an object detected by the radar and the size of the image processing area according to a beam profile of electromagnetic waves outputted from the radar.

In the above, "beam profile" means the beam structure two-dimensionally extending on its sectional surface perpendicular to the direction of its propagation, including the diameter of the beam, its cross-sectional area or its spread angle. "Measurement point of an object detected by the radar" means the coordinates (or the three-dimensional position data) of the measurement point detected as a point where the object is present. More in detail, it means the position of the central axis of the transmission beam as of the time when reflected waves with intensity in excess of a threshold value have been received. In the direction of distance, it means the position at a distance calculated from the delay between the time of emission and reception of reflected waves. A plurality of such measurement points may be present associated with a single object, depending on the size of the object relative to the resolving power (resolution) of the radar. The resolving power of the scanning radar is usually set sufficiently small such that a plurality of measurement points will be detected in the case of an automobile of a regular size. It is preferable that the radar be of a two-dimensionally scanning type but the radar may be of a one-dimensionally scanning type.

By means of an image processor of this invention, an area with a spread corresponding to the cross-section of the radar beam is determined as an image processing area centering around the measurement point detected as a position where an object is present. If the object is of a certain size in the direction of scan by the radar, a plurality of measurement points are present in the direction of the scan and a plurality of image processing areas are accordingly determined.

Thus, if the spread of the beam cross-section is set appropriately, the determined image processing area (or the whole of determined image processing areas if there are a plurality of such areas) can be made to be of an appropriate size at least in the direction of the scan, including an object and an appropriate amount of its background independent of the size of the object. In the case of a relatively small object such as a person or a bicycle, for example, the number of measurement points will be small and the image processing area becomes narrower accordingly. In the case of a larger object such as an ordinary automobile or a truck, the number of measurement points will become larger according to its size and the image processing area becomes wider accordingly in the direction of the scan. If a two-dimensionally scanning radar is used, this effect of the image processing area becoming larger appropriately according to the size of the object is obtainable in both of the two-dimensional directions.

In summary, according to this invention, it is not necessary to use the radar to preliminarily determine accurately the size of the object in order to set the image processing area according to the spreading angle of the radar beam. Thus, it is not necessary to increase the resolving power of the radar in all directions to achieve high response and energy-saving characteristics.

When there are a plurality of measurement points that are close together with respect to the resolving power of the radar, it is preferable that the image processor serve to group together the plurality of measurement points as being associated with a single object and to join image processing areas individually associated with the measurement points as a single image processing area. This has the advantage of joining together the image processing areas associated with the same object, and the image processing becomes simplified for individually identifying objects.

It is preferable that the cross-sectional shape of the beam of electromagnetic waves is a circle or an ellipse. It is also preferable that the spread angle of the beam be smaller than the image angle (or the angle that subtends the field of vision) of the image-taking device in all directions. This is such that the image processing area can be limited to be smaller than the image obtained by the image-taking device and hence the burden on the image processing can be significantly reduced.

The image processor according to a preferred embodiment is adapted to define a reference plane parallel to the road surface supporting the vehicle to which the image processor is mounted, to project measurement points of the object detected by the radar onto this reference plane, to determine a line by connecting two of the projected points thereon, to represent the line in an image-fixed coordinate system and to limit a lower edge of the image processing area by the line represented in the image-fixed coordinate system. With the image processor with such function, the lower end of the image processing area can be conveniently prevented from wastefully extending even in the case of a one-dimensionally scanning radar not adapted to scan in the vertical direction such that the burden on the image processing can be prevented from increasing.

The vertical position (height) of an object such as a front-going vehicle as seen from one's own vehicle depends on the shape of the road surface. Even if there is a height difference between one's own vehicle and the front-going vehicle, the bottom edge of the image processing area can be controlled as explained above without correcting the position of the reference plane when both vehicles are on the same slope. If one's own vehicle is on a horizontal plane while an object is on a sloped surface, however, the object will appear to be at a higher or lower position as seen from one's own vehicle and the vertical position of the reference plane must be corrected. This correction may be effected as follows.

The position of one's own vehicle can be determined by a global positioning system (GPS) and the position of an object can be determined relative to one's own vehicle. The slope data can be obtained from these current positions by means of road map data. Thus, it can be determined at what vertical position the object should be seen from one's own vehicle and the vertical position of the reference plane can be corrected accordingly. The change in the vertical position of the road surface can be determined not necessarily by GPS but, for example, by the change in a white line on the road surface.

It is preferable to start a raster scan of the image processing from a starting position adjacent to the line represented in the image-fixed coordinate system because the object can be more quickly identified by an image processing started from a lower position of the object.

It is also preferable that the size of the image processing area be determined according to the positions (referred to as "half-intensity positions") where the beam intensity of electromagnetic waves outputted from the radar is one-half of the maximum intensity of the electromagnetic waves. This is a matter of how to define the extent of the radar beam (outer periphery), and the positions where the beam intensity is one-half of the maximum value are considered as the outer periphery of the beam. The beam intensity decreases outward from the center. If the positions where this intensity becomes zero were taken as the outer periphery of the beam, the image processing area would become too wide. The image processing area becomes of a reasonable size if the positions with intensity about equal to one-half of the maximum value are taken as the outer periphery.

The image processor may be adapted to reduce the size of the image processing area as the distance to the object detected by the radar increases. This may be done by reducing the set beam profile (such as the radius, cross-sectional area or the spread angle of the beam) as the distance to the object increases. The image processor may also serve to correct the position of the image processing area according to the angle between the central axes of the radar and the image-taking device. By this embodiment, the image processing area can be set at an appropriate position even if the central axes of the radar and the image-taking device are not parallel to each other.

It is preferable to set the shape of the image processing area as a rectangle that circumscribes or inscribes a circle or ellipse having the cross-sectional shape of the beam of electromagnetic waves outputted from said radar. This is because a rectangular image processing area is easier to set. Such a rectangular area may preferably be set by specifying the positions (referred to as "corner positions") of its two mutually diagonally located corners. The amount of data to be processed can thus be reduced.

DETAILED DESCRIPTION OF THE INVENTION

The invention is described next by way of examples.

Figure 1A:
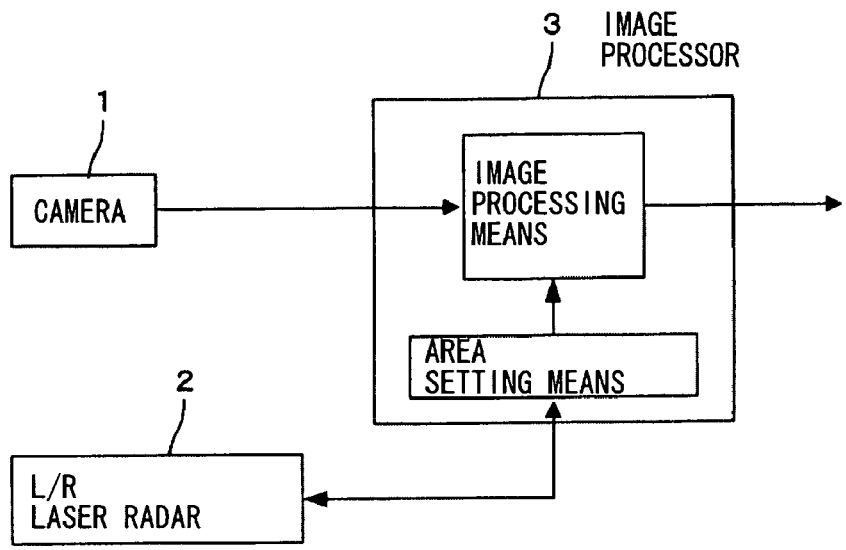
FIG. 1A is a block diagram for showing the structure of a monitoring system including an image processor of this invention to be mounted to a vehicle.
Figure 1B:
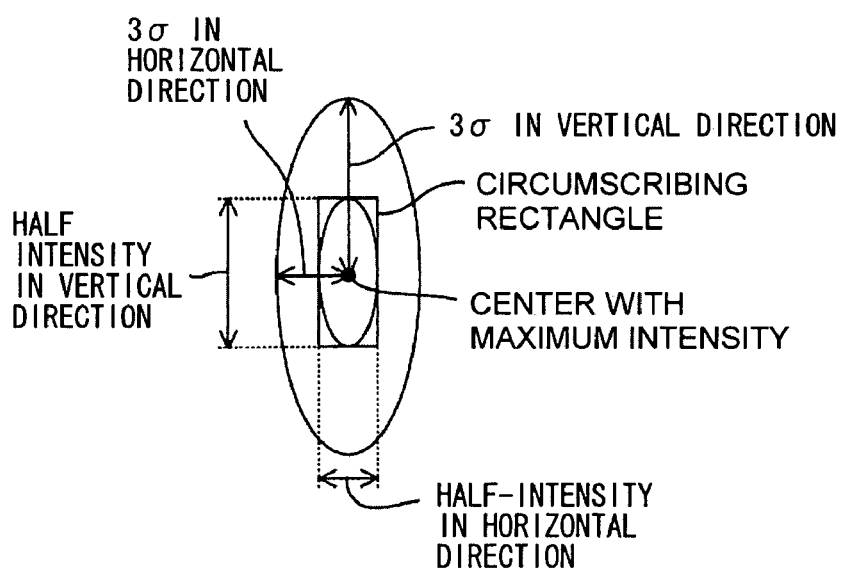
FIG. 1B is a diagram for showing the cross-section of the beam emitted from the laser radar.
Figure 4:
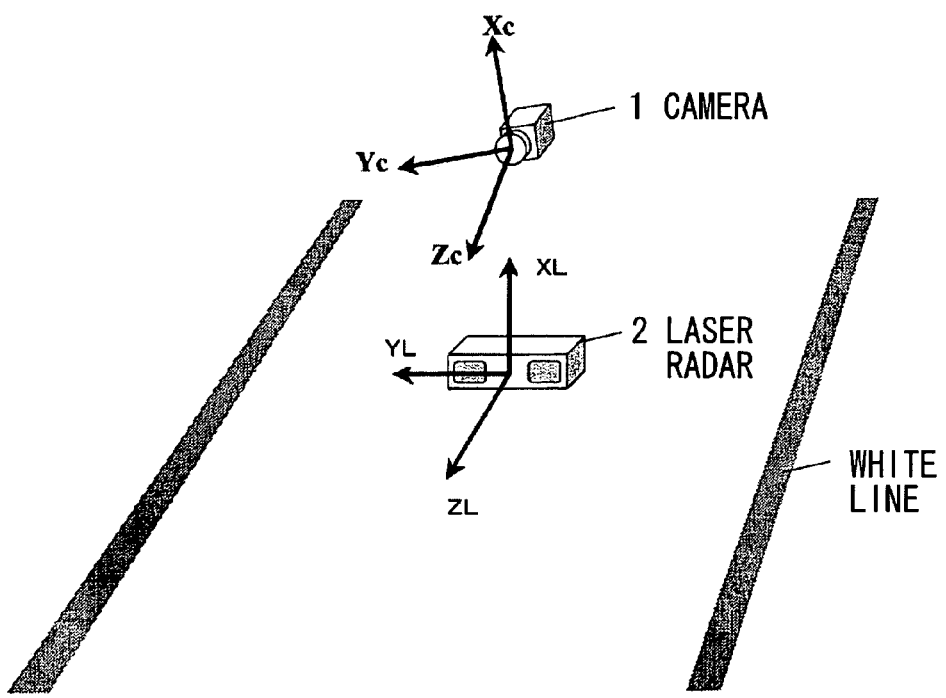
FIG. 4 shows the positional relationship between the camera and the laser radar and the coordinate systems fixed to them.
Figures 11A, 11B:
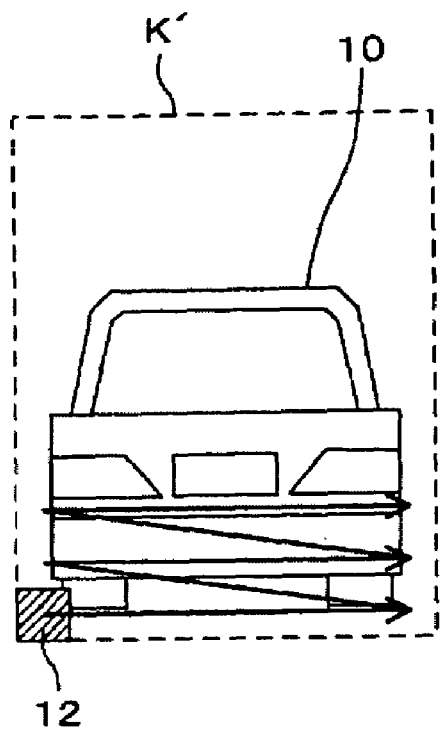
FIGS. 11A and 11B are drawings respectively for explaining raster scanning and a window for raster scanning.

FIG. 1A is a block diagram for showing the structure of a monitoring system comprising an image processor of this invention to be mounted to a vehicle, including a camera 1 serving as an image-taking means, a laser radar (L/R) 2 and an image processor 3 serving both as an image processing area setting means and as an image processing means. The laser radar 2 is of a one-dimensional scanning type adapted to scan one-dimensionally in the horizontal direction, being mounted to a vehicle (one's own vehicle) horizontally, as shown in FIG. 4. The beam emitted from this laser radar 2 has a vertically elongated elliptical cross-sectional shape, as shown in FIG. 11B.

Figure 2A:
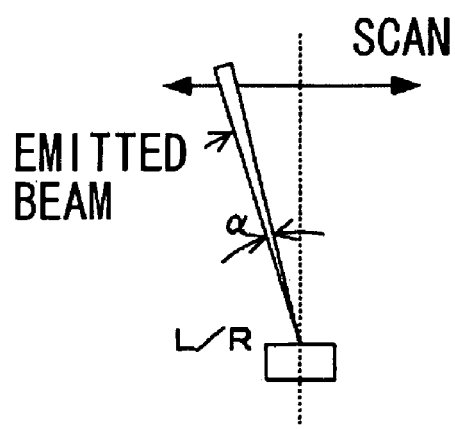
FIGS. 2A and 2B, together referred to as FIG. 2, are respectively a plan view and a side view of the beam emitted from the laser radar.
Figure 2B:
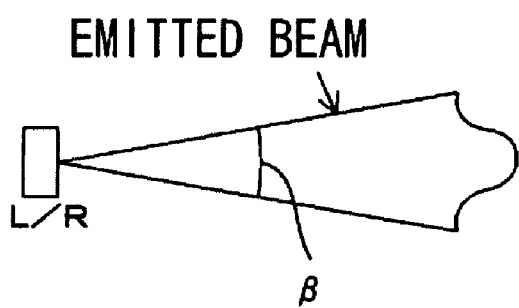

As shown in FIG. 2, the beam from the laser radar 2 has a much smaller horizontal angle $\beta$ of spread than a vertical angle $\alpha$ of spread, both of these angles $\beta$ and $\alpha$ being significantly smaller than the image angle (determining the field of vision) of the camera 1. If the intensity of the laser radar beam is assumed to have a normal Gaussian distribution in the direction of its cross-section with $\sigma$ indicating its standard deviation, the aforementioned angles $\beta$ and a of its spread may be defined as being equal to $3\sigma$.

The camera 1 serves as an image-taking means comprising a well-known device such as a CCD or a CMOS. The system is provided with a single camera, mounted approximately horizontally to one's own vehicle so as to face forward such that an image in front of one's own vehicle can be obtained (as shown in FIG. 4). The central (optical) axes of the camera 1 and the laser radar 2 should preferably be parallel to each other but it is not a requirement.

The image processor 3 comprises a circuit including a microcomputer and serves to control the laser radar 2 to thereby determine a specified image processing area in an image obtained by the camera 1 based on results of measurement by the laser radar 2, to carry out image processing in this image processing area to identify objects in front of the vehicle and to output the obtained data to other controllers of the vehicle.

The processes carried out by the image processor 3 are explained next with reference to the flowchart of FIG. 7.

Figure 7:
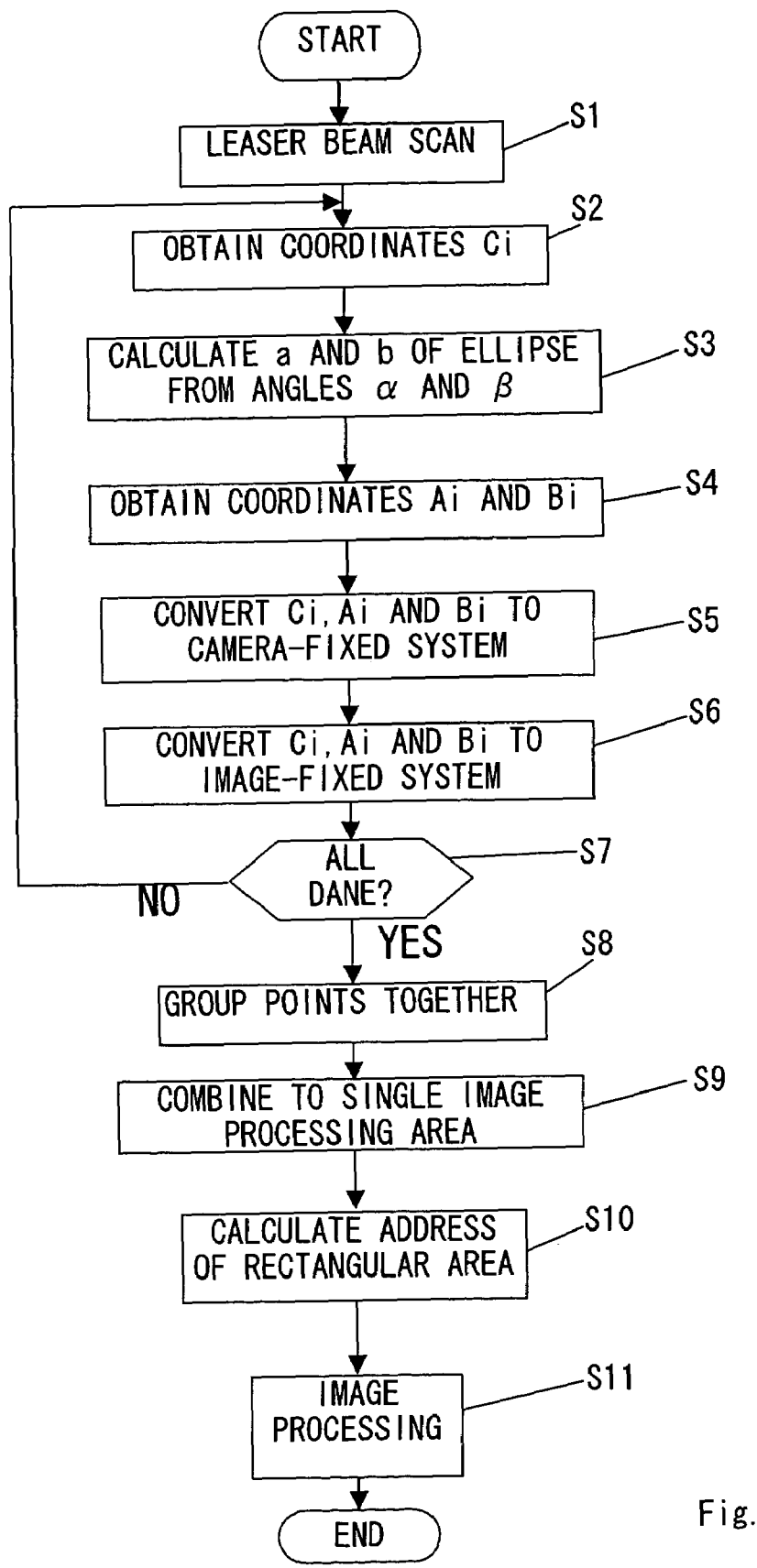
FIG. 7 is a flowchart of the process for determining an image processing area.

To start, as shown in FIG. 7, the image processor 3 carries out measurements by one scan by the laser radar 2 (Step S1). Next, one of the data items is obtained related to the measured positions of an object detected by the operations of the laser radar in Step S1 (Step S2). Explained more in detail, this is done by obtaining coordinates Ci (H, YLi, ZLi) of one of N (=a plural number) measurement points related to the object. In the above, H indicates the coordinate value in the X-direction (up-down direction) as shown in FIG. 4, corresponding to the height of the central axis of the emitted beam of the radar 2. YLi indicates the coordinate value in the Y-direction (left-right direction) as shown in FIG. 4 and is obtained from the scan angle when reflected light exceeding a threshold value is received. ZLi indicates the coordinate value in the Z-direction (forward-backward or distance direction) as shown in FIG. 4 and is obtained from the time of delay from the emission of light when reflected light exceeding a threshold value is received. The position with coordinates Ci on the image is selected as the center of the image processing area.

Figure 5A:
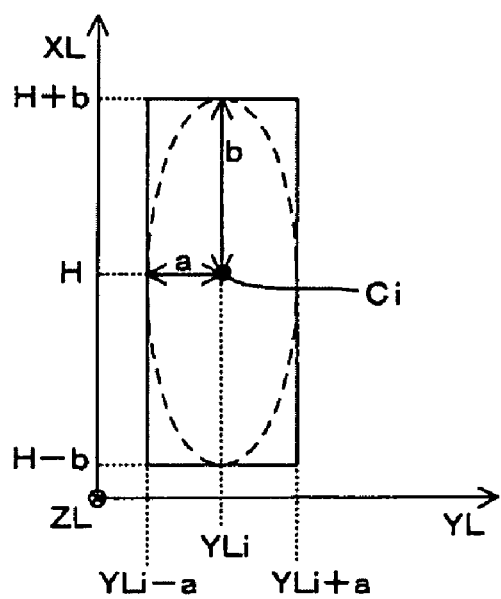
FIG. 5A shows an image processing area and FIG. 5B shows the relationship between the image-fixed and camera-fixed coordinate systems.

Next, Formulas (1) given below are used to calculate the minor and major axes a and b of the beam cross-section (as shown in FIG. 5A) at the measurement distance given by ZLi obtained in Step S2 based on preliminarily determined angles $\beta$ and $\alpha$ of beam spread (Step S3). The values of a and b may be obtained by examining the spread of the cross-section of the beam and from the ellipse representing the Gaussian distribution.

$b = 2ZL \cdot \tan(\beta/2)$ $a = 2ZL \cdot \tan(\alpha/2)$     Formulas (1)

Next, a rectangular area that circumscribes the ellipse obtained in Step S3 with the center at Ci and minor and major axes a and b is set as an image processing area and positions that characterize this rectangular area are obtained (Step S4). They may be taken as the diagonally opposite pair of corners Ai(H+b, YLi-a, ZLi) and Bi(H-b, YLi+a, ZLi) at the upper left-hand side and the lower right-hand side. It goes without saying that the corners at the upper right-hand side and the lower left-hand side may be used for this purpose. Alternatively, a rectangular area that inscribes the ellipse may be used as the image processing area.

Next, the coordinates Ci, Ai and Bi of the laser radar-fixed coordinate system obtained in Steps S2 and S4 are converted into the camera-fixed coordinate system (Xc, Yc, Zc) (Step S5) and further into the image-fixed coordinate system (U, V) (Step S6).

Figure 5B:
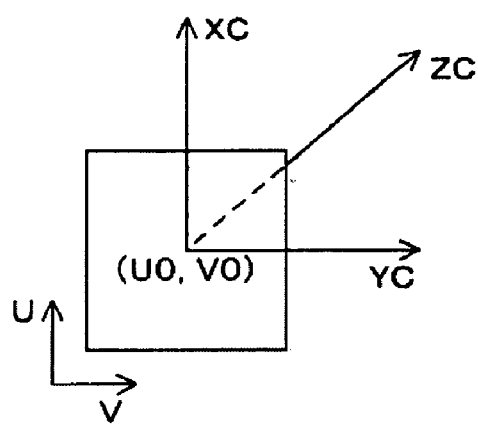

If the coordinate systems and their directions are defined as shown in FIGS. 4 and 5B, the laser radar-fixed coordinate system (XL, YL, ZL), the camera-fixed coordinate system (Xc, Yc, Zc) and the image-fixed coordinate system (U, V) are related as shown by Formulas (2) and (3) given below:

$$\begin{bmatrix} XL \\ YL \\ ZL \end{bmatrix} = R \begin{bmatrix} Xc \\ Yc \\ Zc \end{bmatrix} + T \quad \text{Formula (2)}$$

where R is a 3×3 matrix, T is a 3×1 matrix and both R and T are preliminarily set by a known camera calibration method, and $$U = U0 + \frac{F}{dU} \cdot \frac{Xc}{Zc} \quad \text{Formulas (3)}$$
$$V = V0 + \frac{F}{dV} \cdot \frac{Yc}{Zc}$$

where F is the focal length of the camera 1, (U0, V0) indicates the center of the image and (dU, dV) indicates the length of each pixel.

After Steps S2–S6 are repeated for the coordinates Ci of all measurement points (i=0, . . . , N−1) (YES in Step S7), those of measurement points that are at the same distance (or those points with the same distance data ZLi within a specified error range) are grouped together as relating to the same object or correlated as belonging to the same group (Step S8). It is to be noted, however, that this grouping of points may not be effected although they are at the same distance unless their positions are close enough to be less than or nearly equal to the level of resolution of the radar. For example, the grouping is effected only if the interval between the measurement points in the horizontal direction is equal to or smaller than the resolution of the emitted beam in the horizontal direction (Y-direction) expressed in radians times the distance. Even where this interval in the horizontal direction is equal to or smaller than the resolution, however, the points are considered to belong to different groups if the distance ZLi is greater than a specified range of allowable error.

Next, the image processing areas based on the measurement points grouped in Step S8 are combined into a single image processing area (Step S9). Explained more in detail, the top left-hand coordinate and the bottom right-hand coordinate of such a combined area are obtained as data for characterizing the combined area. In the above, the top left-hand coordinate is one of the grouped upper left-hand coordinates Ai at the position that is the highest and on the farthest left-hand side and the bottom right-hand coordinate is one of the grouped lower right-hand coordinates Bi at the position that is the lowest and on the farthest right-hand side.

Next, the addresses on the image data of areas that were gathered together in Step S9 and those not gathered together are calculated (Step S10), and a specified image processing is carried out in the image processing area specified in Step S10 (Step S11) to identify a vehicle or the like and to output the result to controllers of the vehicle. The processes described above are repeated from Step S1 at a next timing.

Figure 3A:
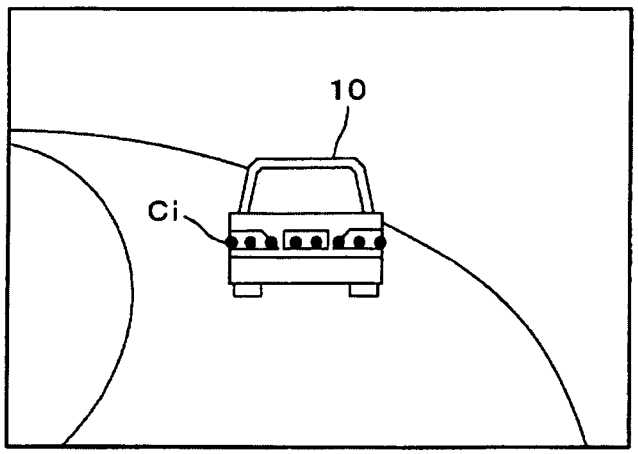
FIG. 3A is an example of image taken by the camera and FIG. 3B is a drawing for showing the relationship between the field of vision of the camera and measurement points.
Figure 3B:
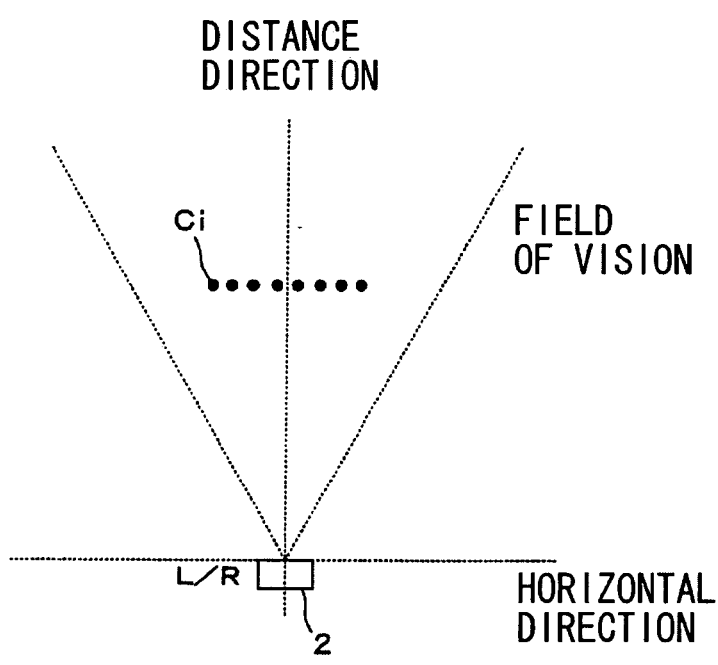

When there is a front-going vehicle 10 as shown in FIG. 3A, or when an image as shown in FIG. 3A is obtained by the camera 1, a plurality of points Ci (i=0, . . . , N−1) may be obtained in Step S1 as shown in FIGS. 3A and 3B.

Figure 6A:
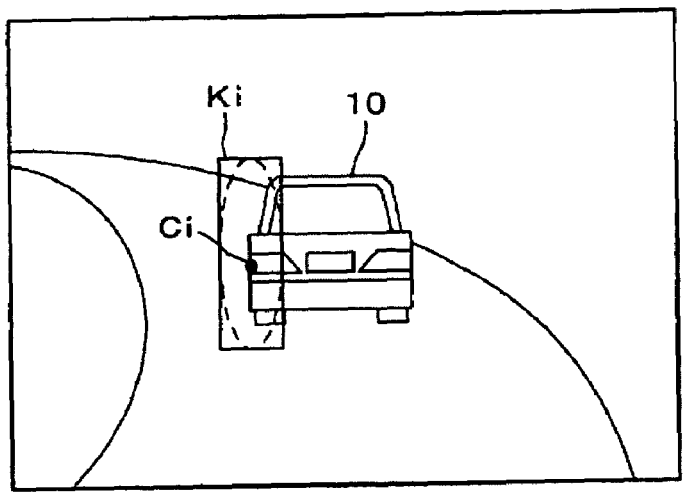
FIGS. 6A, 6B and 6C are drawings for showing how image processing areas are joined.
Figure 6B:
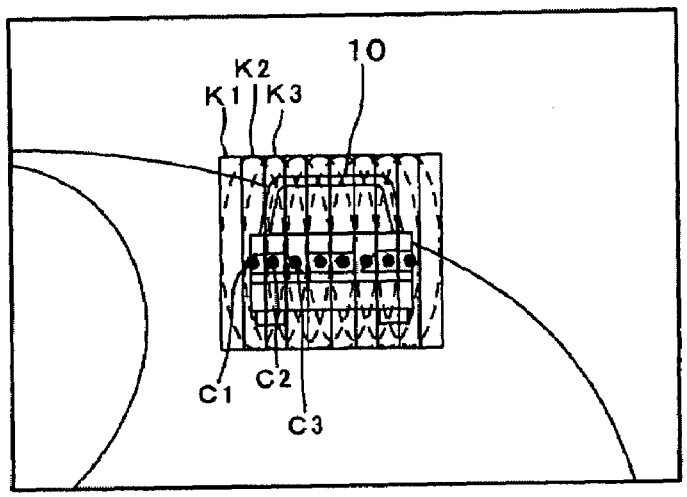
Figure 6C:
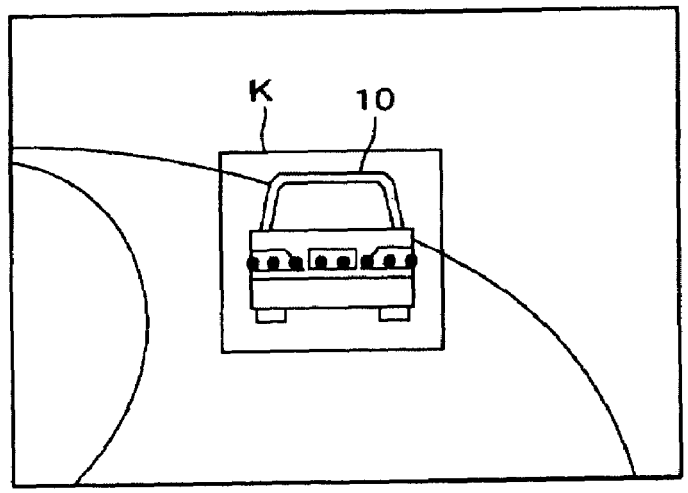

After Steps S2–S6 are carried out, a rectangular area Ki is obtained corresponding to one of the measurement points Ci as shown in FIG. 6A. As Steps S2–S6 are repeated, rectangular areas Ki are obtained for all of the measurement points Ci although only K1–K3 corresponding to points C1–C3 are shown with symbols in FIG. 6B for the clarity of description. As the rectangular areas Ki are combined together in Steps S8–S10, a combined area K is obtained as the final image processing area as shown in FIG. 6C.

In the case of a bicycle which is much narrower than an automobile, the number of combined rectangular areas (or the number of measurement points) is smaller and the finally obtained area becomes accordingly narrower. In the case of a large truck, on the other hand, the number of combined rectangular areas is larger and the finally obtained area becomes accordingly wider. In other words, an image processing area with a different width corresponding to the horizontal size of the object is determined.

With an image processor as described above, an area centered around a position where an object is detected and having a spread according to the beam cross-section of the radar is determined as the image processing area. In the case of an object with a certain size in the scanning direction of the radar, a plurality of measurement points are present in the scanning direction and a plurality of image processing areas are accordingly determined. Thus, if the spread of the beam cross-section is set appropriately, the whole (or the combination) of the determined image areas becomes an appropriate area appropriately including the target object and its surroundings independently of the size of the object at least in the scanning direction. In the case of a person or a bicycle which is relatively narrow, for example, the number of measurement points becomes smaller and the image processing area becomes accordingly narrower in the scanning direction. In the case of a relatively larger object such as a passenger car or a truck, the number of measurement points increases according to its large size and the image processing area becomes proportionally wider.

The example explained above is further characterized in that the image processing area is determined according to the spread of the beam cross-section and hence the size of the object need not be determined accurately by the radar. Thus, the resolution of the radar in its scanning direction need not be increased, as required by the technology of aforementioned Japanese Patent Publication Tokkai 6-124340, and a high-level response characteristic can be obtained in an energy-saving manner.

If there are a plurality of measurement points on an object detected by the radar and if these measurement points are close to each other such that their separations are less than the resolving power of the radar, these measurement points are grouped together as relating to the same object and the image processing areas associated with these measurement points are joined together as one image processing area. This makes the image processing easier for distinguishing individual objects.

According to this example described above, furthermore, the spread angle of the radar beam is smaller than the angle that spans the field of vision of the camera 1 in all directions. Thus, the image processing area can be made smaller in any direction than the image obtained by the image-taking device and the burden on the image processing can be reduced significantly. The spread angle of beam may be set about equal to the image angle of the camera in the vertical direction in which no scanning is to be effected according to the example described above.

The image processing area is defined to be rectangular according to the example described above. This has the advantage of makes its setting easier.

Next, an image processor according to a second embodiment of the invention is described, which is characterized as further limiting the image processing area on the lower edge side in the vertical direction along which scanning is not carried out.

An image processor according to the second embodiment carries out the following process between Steps S10 and S11 of the flowchart of FIG. 7.

Figure 8A:
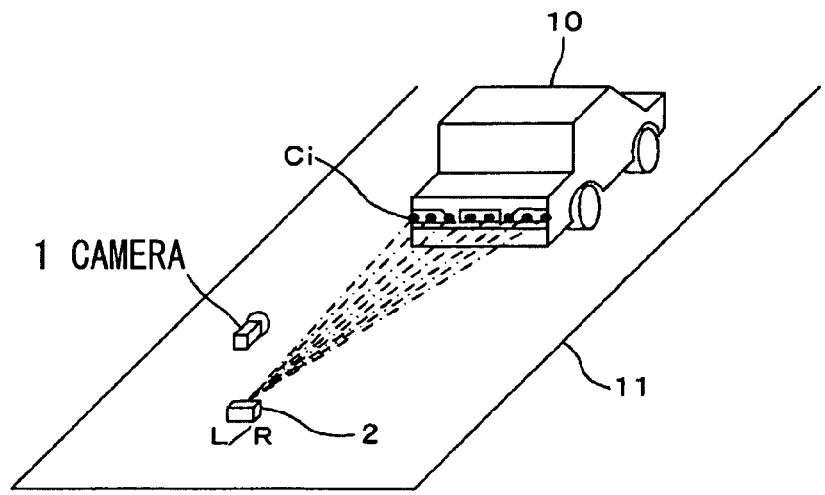
FIG. 8A shows a reference plane on which measurement point is projected and FIG. 8B shows the projection thereonto.

Firstly, as shown in FIG. 8A, a reference plane 11 is defined parallel to the surface of the road supporting one's own vehicle (which may be the road surface itself). If the camera 1 is set parallel to this road surface, this plane 11 may be characterized by the height Xc in the aforementioned camera-fixed coordinate system (Xc, Yc, Zc), representing the height of the optical axis of the camera 1 from the road surface on which is one's own vehicle. If the road is flat, as shown in FIG. 8A, this plane 11 is also parallel to the road surface at the position of a front-going vehicle 10.

Figure 8B:
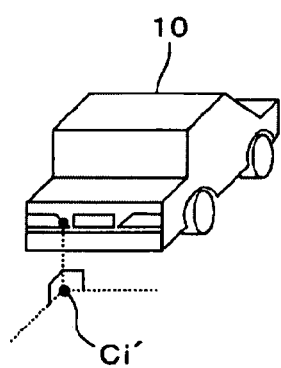
Figure 9A:
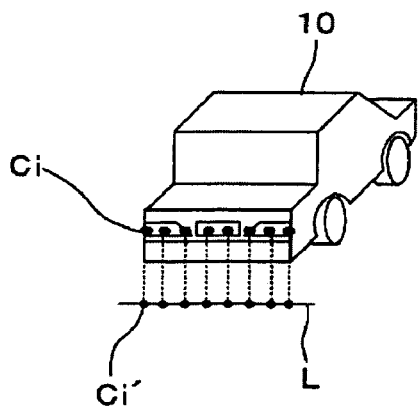
FIG. 9A shows a line connecting projected points and FIG. 9B shows the line on an image.
Figure 9B:
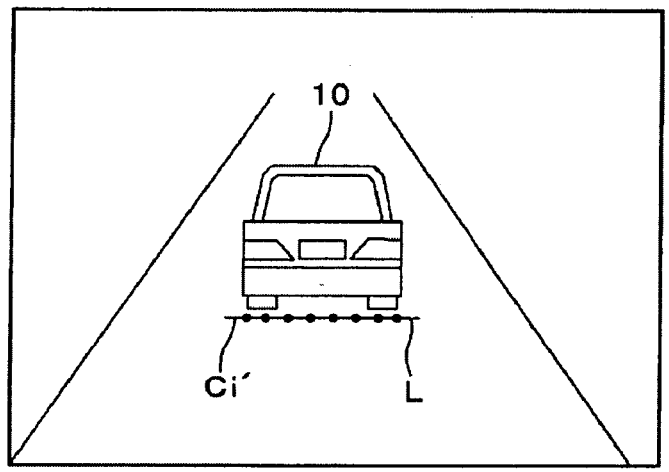
Figure 10A:
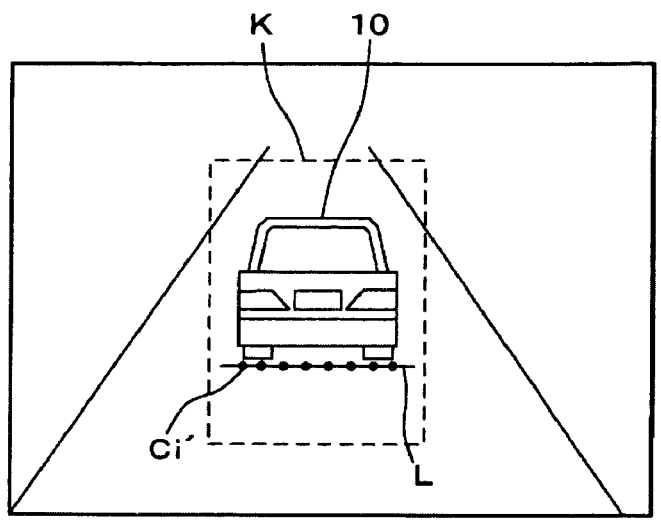
FIGS. 10A and 10B show image processing areas respectively before and after the bottom portions are limited by the line of FIGS. 9A and 9B.
Figure 10B:
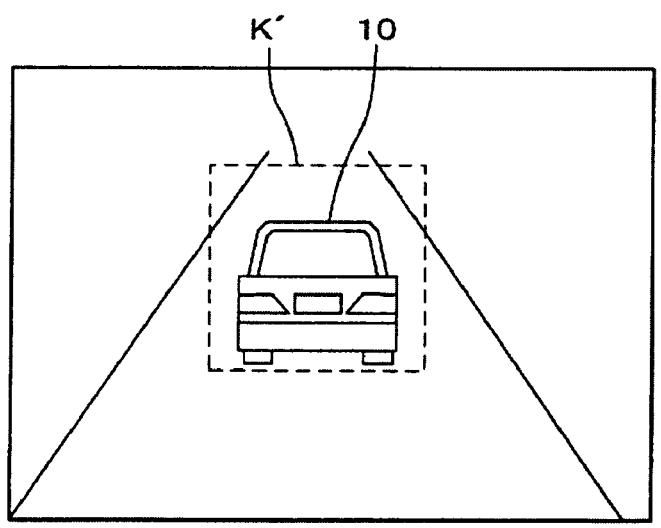

Next, a measurement point on an object detected by the radar (such as the coordinates Ci of a measurement point on the front-going vehicle 10 obtained in Step S5 of the flowchart of FIG. 7) is projected onto the plane 11 as shown in FIG. 8B and the coordinates of this projected point Ci' are obtained. Next, as shown in FIG. 9A, a line L is obtained by connecting two or more of such projected points Ci', and the line L thus obtained is converted into the image-fixed coordinate system as shown in FIG. 9B. As an image processing area K is determined on this image as shown in FIG. 10A, this converted line L is used to limit the lower edge of the image processing area K' as shown in FIG. 10B.

By this embodiment of the invention, even if a one-dimensional scanning radar is used such that there is no scanning carried out in the up-down direction and the beam spread in the vertical direction is set sufficiently large so as to avoid the possibility of detection failure in this direction, the lower edge of the image processing area can be limited according to the minimum requirement so as not to make it uselessly long in the vertical direction.

In this case, it is preferable to start a raster scanning of the image processing from a position adjacent to the line L after the conversion to the image-fixed coordinate system, as shown in FIG. 11A. This means that the image processing is started from the lower part of the object, and the object can be more quickly identified by the image processing. In FIG. 11A, numeral 12 indicates a window for extracting characteristics by the raster scan, comprising a plurality of pixels as shown in FIG. 11B (showing an example of area with 3×3 pixels). FIG. 11B further shows an example of image data such as brightness values of an image. By a raster scanning process, a window as shown at 12 is moved as shown by the arrows in FIG. 11A to extract the edge on an image of an object, say, by cumulative addition calculation.

Next, FIG. 12 is referenced to describe a third embodiment of the invention adapted to reduce the size of the image processing area (or the spread of the beam cross-section) as the distance to the object measured by the radar 2 increases.

According to this embodiment, the image processor 3 carries out any of the following processes (Processes 1, 2 and 3) in Step S3 of the flowchart of FIG. 7.

Figure 12A:
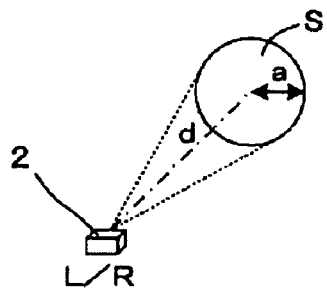
FIGS. 12A and 12B are drawings for showing the spreading of the cross-sectional surface of the radar beam respectively when the measured distance is normal and when the measured distance is greater than normal.
Figure 12B:
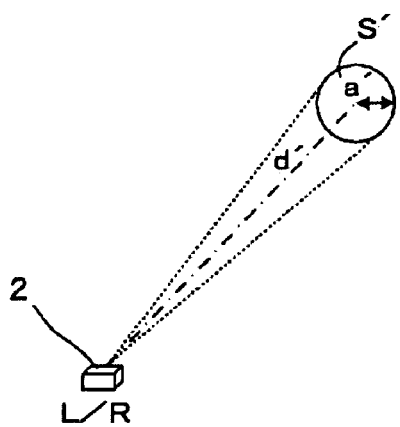
Figure 12C:
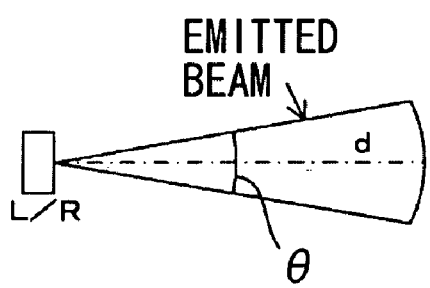
FIGS. 12C and 12D are drawing for showing the spreading of the radar beam respectively when the measured distance is normal and when the measured distance is greater than normal.
Figure 12D:
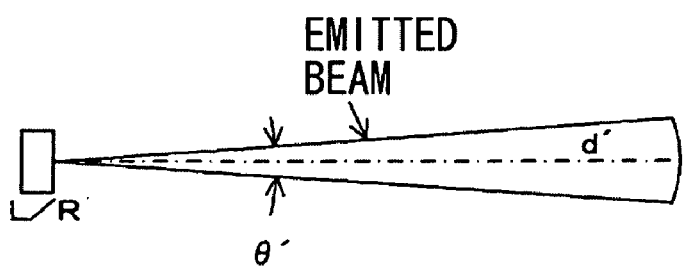

Process 1 is that of changing the radius "a" of the beam according to the distance ZL obtained in Step S2 as the result of measurement by the radar based on Formula (4) shown below:

$$a' = \frac{K1}{d' - d} a \qquad \text{Formula (4)}$$

where a is the beam radius before the change, a' is the beam radius after the change, d is a standard distance, d' is a distance as result of measurement (as shown in FIGS. 12A and 12B) and K1 is a constant for adjustment.

Process 2 is that of changing the beam radius according to the distance ZL such that the cross-sectional area of the beam will change as shown by Formula (5) given below:

$$S = \frac{K2}{(d' - d)^2} S \qquad \text{Formula (5)}$$

where S is the beam cross-section before the change, S' is the beam cross-section after the change, d and d' are as defined above and K2 is another constant for adjustment.

Process 3 is that of changing the spread angle of the beam according to the distance ZL as shown by Formula (6) given blow:

$$\theta' = \frac{K3}{d' - d} \theta \qquad \text{Formula (6)}$$

where θ is the spread angle of the beam before the change, θ' is the spread angle of the beam after the change, d and d' are as defined above and K3 is still another constant for adjustment.

According to this embodiment of the invention, the size of the image processing area can be adjusted to be appropriately small even after the distance to the object has increased because the reflected light from a large distance returns only through the center of the beam where the intensity is high and the object is closer to the center of the beam.

Next, a fourth embodiment of the invention is explained according to which the image processor 3 carries out a correction process as will be explained below between Steps S2 and S3 of the flowchart of FIG. 7 such that the position of the image processing area is adjusted according to the angle between the central axes of the camera 1 and the radar 2.

Figure 14A:
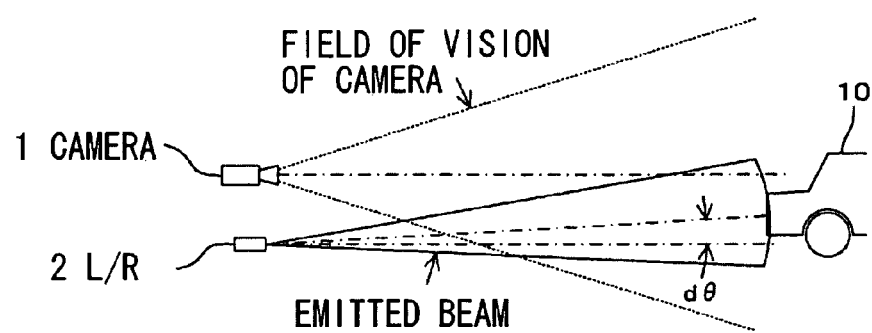
FIG. 14A shows the camera and the laser radar when their center axes are not parallel and FIG. 14B shows an image processing area at a displaced position.

Let dθ indicate the angle in the vertical direction between the central axes of the camera 1 and the radar 2 as shown in FIG. 14A. In this situation, the coordinate of each measurement point Ci in the vertical direction (XL) is changed from H to $H+ZL \cdot \tan(d\theta)$.

Figure 13A:
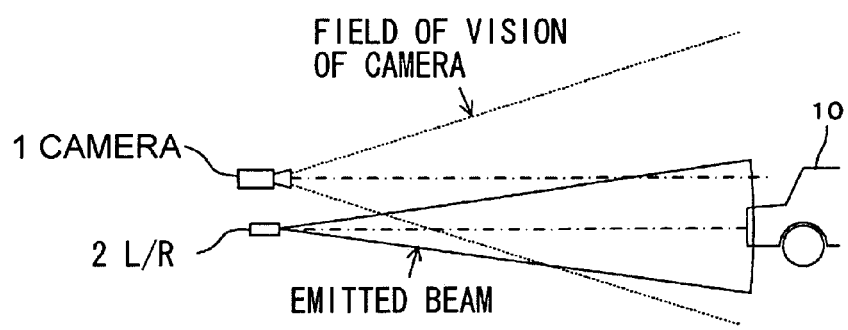
FIG. 13A shows the camera and the laser radar when their center axes are parallel and FIG. 13B shows an image processing area at a normal position.
Figure 13B:
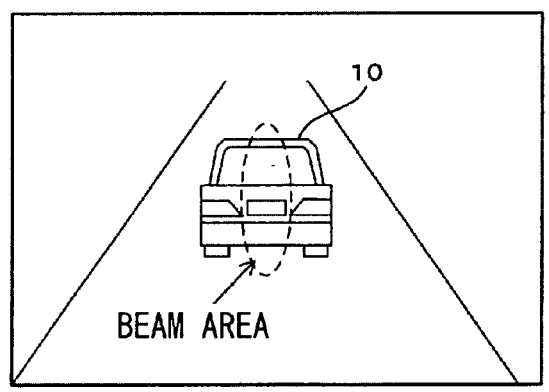
Figure 14B:
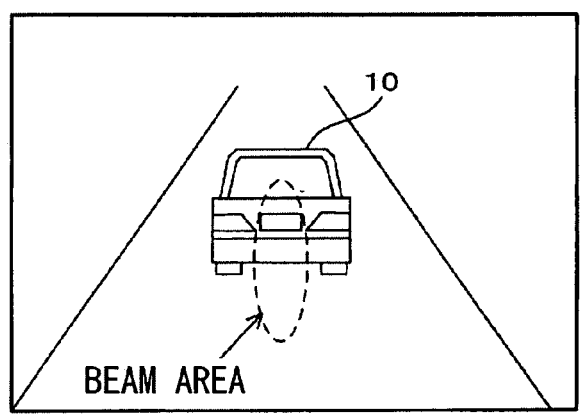

If the coordinate conversion formula is set under the condition where the central axes of the camera 1 and the radar 2 are parallel as shown in FIG. 13A, the position of the beam area (that is, the position of the image processing area) remains proper as shown in FIG. 13B as long as these central axes remain parallel to each other. If the central axes of the camera 1 and the radar 2 cease to be parallel for whatever reason, as shown in FIG. 14A, the image processing area becomes displaced from its proper position as shown in FIG. 14B. If the radar is provided with an angular sensor with the function of changing the direction of its central beam upward as the distance to the front-going vehicle becomes shorter, the image processing area can be corrected to the normal condition as shown in FIG. 13B by effecting the adjustment described above.

It goes without saying that these embodiments described above are not intended to limit the scope of the invention. Many further modifications and variations are possible within the scope of this invention. For example, this invention is applicable equally well to a system provided with a radar of the two-dimensional scanning type. In such a case, the size of the image processing area can be adjusted in all scanning directions. Although a laser radar was used as an example for illustration, this may be replaced with a radar of any other kind such as an RF radar, and the disclosure is intended to be interpreted broadly to include such other kinds of radar.

The cross-sectional area of the electromagnetic waves need not be elliptical but may be circular. In the case of a two-dimensional scanning radar, in particular, there is no stringent requirement to elongate cross-sectional shape of the beam in the vertical direction in order to prevent detection failure in the up-down direction.

What is claimed is:

1. An image processing system for mounting to a vehicle, said image process comprising:
   a radar adapted to measure distance and direction to an object outside said vehicle based on reflected electromagnetic waves which are outputted therefrom by scanning outside said vehicle;
   an image-taking device which obtains an image; and
   an image processor for carrying out image processing on a specified image processing area in an image obtained by said image-taking device;
   wherein said image processor serves to determine a center position of said image processing area according to a measurement point of an object detected by said radar and the size of said image processing area according to a beam profile of electromagnetic waves outputted from said radar.

2. The image processing system of claim 1 wherein said image processor serves, when there are a plurality of measurement points that are close together with respect to the resolving power of said radar, to group together said plurality of measurement points as being associated with a single object and to join image processing areas individually associated with said measurement points as a single image processing area; and
   wherein said electromagnetic waves form a beam which has a cross-sectional shape of a circle or an ellipse and spreads with a spread angle that is smaller than the image angle of said image-taking device in all directions.

3. The image processing system of claim 2 wherein said image processor defines a plane which is parallel to the road surface supporting said vehicle, projects measurement points of the object detected by said radar onto said plane, determines a line by connecting two of the projected points on said plane, represents said line in an image-fixed coordinate system, limits a lower edge of said image processing area by said line represented in said image-fixed coordinate system and starts a raster scan of said image processing from a starting position adjacent to said line represented in said image-fixed coordinate system.

4. The image processing system of claim 3 wherein said image processor determines the size of said image processing area according to half-intensity positions where the beam intensity of electromagnetic waves outputted from said radar is one-half of the maximum intensity of said electromagnetic waves and reduces the size of said image processing area as the distance to said object detected by said radar increases.

5. The image processing system of claim 3 wherein said image processor corrects the position of said image processing area according to the angle between the central axes of said radar and said image-taking device.

6. The image processing system of claim 2 wherein said image processor determines the size of said image processing area according to half-intensity positions where the beam intensity of electromagnetic waves outputted from said radar is one-half of the maximum intensity of said electromagnetic waves and reduces the size of said image processing area as the distance to said object detected by said radar increases.

7. The image processing system of claim 2 wherein said image processor corrects the position of said image processing area according to the angle between the central axes of said radar and said image-taking device.

8. The image processing system of claim 2 wherein said image processor determines the shape of said image processing area as a rectangle that circumscribes or inscribes a circle or ellipse having the cross-sectional shape of the beam of electromagnetic waves outputted from said radar and identifies said image processing area by corner positions of two mutually diagonally located angles of said rectangle.

9. The image processing system of claim 3 wherein said image processor determines the shape of said image processing area as a rectangle that circumscribes or inscribes a circle or ellipse having the cross-sectional shape of the beam of electromagnetic waves outputted from said radar and identifies said image processing area by corner positions of two mutually diagonally located angles of said rectangle.

10. The image processing system of claim 1 wherein said image processor defines a plane which is parallel to the road surface supporting said vehicle, projects measurement points of the object detected by said radar onto said plane, determines a line by connecting two of the projected points on said plane, represents said line in an image-fixed coordinate system, limits a lower edge of said image processing area by said line represented in said image-fixed coordinate system and starts a raster scan of said image processing from a starting position adjacent to said line represented in said image-fixed coordinate system.

11. The image processing system of claim 10 wherein said image processor determines the size of said image processing area according to half-intensity positions where the beam intensity of electromagnetic waves outputted from said radar is one-half of the maximum intensity of said electromagnetic waves and reduces the size of said image processing area as the distance to said object detected by said radar increases.

12. The image processing system of claim 10 wherein said image processor corrects the position of said image processing area according to the angle between the central axes of said radar and said image-taking device.

13. The image processing system of claim 10 wherein said image processor determines the shape of said image processing area as a rectangle that circumscribes or inscribes a circle or ellipse having the cross-sectional shape of the beam of electromagnetic waves outputted from said radar and identifies said image processing area by corner positions of two mutually diagonally located angles of said rectangle.

14. The image processing system of claim 1 wherein said image processor determines the size of said image processing area according to half-intensity positions where the beam intensity of electromagnetic waves outputted from said radar is one-half of the maximum intensity of said electromagnetic waves and reduces the size of said image processing area as the distance to said object detected by said radar increases.

15. The image processing system of claim 1 wherein said image processor corrects the position of said image processing area according to the angle between the central axes of said radar and said image-taking device.

16. The image processing system of claim 1 wherein said image processor determines the shape of said image processing area as a rectangle that circumscribes or inscribes a circle or ellipse having the cross-sectional shape of the beam of electromagnetic waves outputted from said radar and identifies said image processing area by corner positions of two mutually diagonally located angles of said rectangle.

17. The image processing system of claim 1 wherein said image-taking device is adapted to obtain an image in the direction in which said electromagnetic waves are outputted by said radar.

18. The image processing system of claim 1 wherein said radar is a laser radar.

* * * * *